United States Patent
Yanagisako (10) Patent No.: US 10,149,183 B2
(45) Date of Patent: Dec. 4, 2018

(54) HETEROGENEOUS-NETWORK-USE BASE STATION, MOBILE COMMUNICATION DEVICE, AND COMMUNICATION METHOD

(71) Applicant: NEC Corporation, Minato-ku, Tokyo (JP)

(72) Inventor: Yoshifumi Yanagisako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 15/304,909

(22) PCT Filed: May 11, 2015

(86) PCT No.: PCT/JP2015/002362
§ 371 (c)(1),
(2) Date: Oct. 18, 2016

(87) PCT Pub. No.: WO2015/174060
PCT Pub. Date: Nov. 19, 2015

(65) Prior Publication Data
US 2017/0142603 A1    May 18, 2017

(30) Foreign Application Priority Data

May 16, 2014  (JP) ................................. 2014-102137

(51) Int. Cl.
*H04W 24/06* (2009.01)
*H04W 16/18* (2009.01)
(Continued)

(52) U.S. Cl.
CPC ........... *H04W 24/06* (2013.01); *H04W 16/18* (2013.01); *H04W 24/10* (2013.01); *H04W 72/0446* (2013.01); *H04W 84/045* (2013.01)

(58) Field of Classification Search
CPC .............................. H04W 24/10; H04W 24/06
See application file for complete search history.

(56) References Cited

U.S. PATENT DOCUMENTS 8,571,542 B2  10/2013  Wu
8,831,586 B2   9/2014  Gao et al.
(Continued)

FOREIGN PATENT DOCUMENTS

JP   2012-010340 A   1/2012
JP   2012-105323 A   5/2012
(Continued)

OTHER PUBLICATIONS

Japanese Office Action for JP Application No. 2016-519104 dated Aug. 8, 2017 with English Translation.
(Continued)

*Primary Examiner* — Shukri Taha (57) ABSTRACT

A mobile communication device that is used in a heterogeneous network and is in a standby state has low reliability in measurement data obtained by MDT (Minimization Drive Tests) measurement. A base station includes at least one of ABS (Almost Blank Subframe) information and nonABS information in broadcast information (System Information Block), sets a subframe pattern used for the MDT (Minimization Drive Tests) measurement in at least one of the ABS information and the nonABS information, includes the subframe pattern used for the measurement in the broadcast information, and transmits the broadcast information. The mobile communication device receives the broadcast information including at least one of the ABS information and the nonABS information, detects, in a standby state, a subframe pattern used for the MDT measurement from the broadcast information, detects a subframe pattern used for the measurement, performs measurement, stores a result of the measurement as measurement data, and transmits the measurement data.

8 Claims, 6 Drawing Sheets

(51) Int. Cl.
*H04W 24/10* (2009.01)
*H04W 72/04* (2009.01)
*H04W 84/04* (2009.01)

(56) References Cited

U.S. PATENT DOCUMENTS

2011/0312306 A1   12/2011  Wu
2013/0012188 A1    1/2013  Gao et al.
2013/0084910 A1    4/2013  Suzuki et al.
2013/0272274 A1   10/2013  Ishida et al.

FOREIGN PATENT DOCUMENTS

| | | |
|---|---|---|
| JP | 2013-522987 A | 6/2013 |
| JP | 2013-219700 A | 10/2013 |
| WO | 2012/111260 A1 | 8/2012 |
| WO | 2013/067015 A1 | 5/2013 |
| WO | 2013/141624 A1 | 9/2013 |

OTHER PUBLICATIONS

3rd Generation Partnership Project; Technical Specification Group Radio Access Network; WG4#68, R4-133450, "FeICIC interference estimation under signaling", Qualcomm, Barcelona, Spain, Aug. 19-23, 2013.
International Search Report for PCT Application No. PCT/JP2015/002362, dated Jul. 14, 2015.
English translation of Written opinion for PCT Application No. PCT/JP2015/002362.
3GPP TSG-RAN WG2 Meeting #72, R2-106449, "Signalling support for Almost Blank Subframe patterns", Agenda item: 7.6.1.1, Source: Alcatel-Lucent, Nov. 15-19, 2010, Jacksonville.
Extended European Search Report for EP Application No. EP15793030.6 dated Jan. 22, 2018.

Aggressor Cell INTERFERING CELL

| #0 | #1 | #2 | #3 | #4 | #5 | #6 | #7 | #8 | #9 |

Serving Cell(Victim Cell) INTERFERED CELL

| #0 | #1 | #2 | #3 | #4 | #5 | #6 | #7 | #8 | #9 |

Neighbour Cell(Victim Cell) NEIGHBORING CELL

| #0 | #1 | #2 | #3 | #4 | #5 | #6 | #7 | #8 | #9 |

```
LogMeasInfoList-r10 ::=    SEQUENCE (SIZE (1..maxLogMeasReport-r10)) OF LogMeasInfo-r10

LogMeasInfo-r10 ::=    SEQUENCE {
    locationInfo-r10         LocationInfo-r10           OPTIONAL,
    relativeTimeStamp-r10    INTEGER (0..7200),
    servCellIdentity-r10     CellGlobalIdEUTRA,
    measResultServCell-r10   SEQUENCE {
        rsrpResult-r10           RSRP-Range,
        rsrqResult-r10           RSRQ-Range
    },
    measResultNeighCells-r10 SEQUENCE {
        measResultList2EUTRA-r10    MeasResultList2EUTRA-r9       OPTIONAL,
        measResultList2UTRA-r10     MeasResultList2UTRA-r9        OPTIONAL,
        measResultList2GERAN-r10    MeasResultList2GERAN-r10      OPTIONAL,
        measResultList2CDMA2000-r10 MeasResultList2CDMA2000-r9    OPTIONAL
    }  OPTIONAL,
    ...
}
```

HETEROGENEOUS-NETWORK-USE BASE STATION, MOBILE COMMUNICATION DEVICE, AND COMMUNICATION METHOD

This application is a National Stage Entry of PCT/JP2015/002362 filed on May 11, 2015, which claims priority from Japanese Patent Application 2014-102137 filed on May 16, 2014, the contents of all of which are incorporated herein by reference, in their entirety.

TECHNICAL FIELD

The present invention relates to a mobile communication system, and more particularly, to a base station, a mobile communication device, and a communication method that are used for a mobile communication system.

BACKGROUND ART

LTE (Long Term Evolution)-Advanced will be mainly described below, but the present invention is not particularly limited to this.

In the LTE-Advanced, carrier aggregation (CA) in which a plurality of frequency bands are combined, a plurality of cells in different sizes, CoMP (Coordinated Multipoint) that allows a plurality of base stations to coordinate with each other, and a combination of a plurality of different communication techniques are taken into consideration. An LTE-Advanced network has a heterogeneous network (HetNet) configuration.

In the LTE-Advanced, in order to optimize an operating cost and a maintenance cost of a network, so-called MDT (Minimization of Drive Tests) in which drive tests are automatically conducted, instead of conducting drive tests manually, is taken into consideration. The MDT described herein refers to operation in which a mobile communication device performs measurement on network performance in response to a request from a network-side apparatus, collects and records measurement data and reports the data to the network-side apparatus. Accordingly, the measurement data of the mobile communication device include position information about the mobile communication device and a network operator is able to optimize coverage of the network by referring to the position information.

Further, the MDT is classified into an immediate MDT and a logged MDT. The immediate MDT is executed by a mobile communication device that is in a connected state, and the logged MDT is executed mainly by a mobile communication device that is in a standby (idle) state. There is also a logged MDT to be executed by a mobile communication device in a connected state. Data collected in the MDT measurement are stored in a measurement log (MDT log) and are thereafter reported to the network-side apparatus. Collection of measurement information by the MDT enables a network operator to find a problem with coverage of a measurement area and to minimize artificial drive tests.

The network-side apparatus described herein may include various network-side apparatuses, such as an eNB (evolved Base Station), an HeNB (Home evolved Base Station), an RNC (Radio Network Controller), a GW (Gate Way), and an MME (Mobile Management Entity). These network-side apparatuses described herein are collectively referred to as a base station. The mobile communication device may include a cellular phone, a smartphone, a PC, a tablet terminal, and the like.

PTL 1 discloses a method for reporting an MDT log in an LTE system. Specifically, PTL 1 discloses an exchange procedure of a signal message for MDT between a base station and a mobile communication device. In PTL 1, among signaling radio bearers (SRBs) including SRB0, SRB1, and SRB2, SRB1 and SRB2 are used. Specifically, PTL 1 proposes a method in which the base station transmits a request message by SRB1 and the mobile communication device transmits a response message including an MDT log on SRB2.

PTL 2 discloses a method and a system in which not only a drive test result in a mobile communication device connected to a serving cell is reported to a base station but also information about a cell neighboring the serving cell is reported to the base station.

PTL 3 discloses a radio communication system in which a mobile terminal apparatus measures reception quality respectively from reference signals respectively multiplexed on a protect subframe whose transmission is suppressed by a macrocell and on a non-protect subframe whose transmission is not suppressed by the macrocell, and notifies a base station apparatus of the measured reception quality.

CITATION LIST

Patent Literature

PTL 1: Japanese Unexamined Patent Application Publication No. 2012-10340

PTL 2: Published Japanese Translation of PCT International Publication for Patent Application, No. 2013-522987

PTL 3: Japanese Unexamined Patent Application Publication No. 2012-105323

SUMMARY OF INVENTION

Technical Problem

PTL 1 and PTL 2 do not disclose any application of the MDT reporting method to a heterogeneous network. Specifically, PTL 1 and PTL 2 do not suggest any problem with MDT measurement, recording, and reporting in a heterogeneous network in which the macrocell, a small cell having a cell size smaller than that of the macrocell, a microcell, a picocell, a femtocell, and/or the like coexist in the macrocell.

According to study by the present inventors, it has turned out that when the methods disclosed in PTL 1 and PTL 2 are applied to a heterogeneous network in which cells of different sizes coexist, MDT information does not always represent an actual communication state accurately. In the present MDT, it is impossible to acquire data indicating whether interference is actually avoided. In particular, it has turned out that it is more problematic to report MDT measurement data from a mobile communication device that is in an idle state, i.e., a standby state, to a base station. PTL 3 also fails to disclose a method for avoiding the problem when the MDT measurement data are reported from the mobile communication device that is in an idle state, i.e., a standby state, to the base station.

Solution to Problem

An object of the present invention is to provide a base station, a mobile communication device, and a communication method capable of executing MDT suitable for a heterogeneous network in which cells of different sizes coexist.

According to the first aspect of the present invention, a heterogeneous-network-use base station comprising: control means for including at least one of ABS (Almost Blank Subframe) information and nonABS information in broadcast information (System Information Block) and setting a subframe pattern used for MDT (Minimization Drive Tests) measurement in at least one of the ABS information and the nonABS information; and transmission means for including the subframe pattern used for the measurement in the broadcast information and for transmitting the broadcast information, is provided.

According to the second aspect of the present invention, a mobile communication device comprising: means for receiving broadcast information (System Information Block) including at least one of ABS (Almost Blank Subframe) information and nonABS information; control means for detecting, in a standby state, a subframe pattern used for MDT (Minimization Drive Tests) measurement from the broadcast information, detecting the subframe pattern used for the measurement, performing measurement in accordance with the subframe pattern, and transmitting the measurement data; and storage means for storing a result of the measurement as measurement data, is provided.

According to the third aspect of the present invention, a communication method for a heterogeneous-network-use base station, comprising: including at least one of ABS (Almost Blank Subframe) information and nonABS information in broadcast information (System Information Block) and setting a subframe pattern used for MDT (Minimization Drive Tests) measurement in at least one of the ABS information and the nonABS information; and including the subframe pattern used for the measurement in the broadcast information and transmitting the broadcast information, is provided.

According to the fourth aspect of the present invention, a communication method for a mobile communication device, comprising: receiving broadcast information (System Information Block) including at least one of ABS (Almost Blank Subframe) information and nonABS information; detecting, in a standby state, a subframe pattern used for MDT (Minimization Drive Tests) measurement from the broadcast information; detecting a subframe pattern used for the measurement and performing measurement; storing a result of the measurement as measurement data; and transmitting the measurement data, is provided.

According to the fifth aspect of the present invention, a non-transitory recording medium storing a computer program for a base station, the computer program causing a processor to execute the processes of: including at least one of ABS (Almost Blank Subframe) information and nonABS information in broadcast information (System Information Block) and setting a subframe pattern used for MDT (Minimization Drive Tests) measurement in at least one of the ABS information and the nonABS information; and transmitting the subframe pattern used for the measurement, is provided.

According to the sixth aspect of the present invention, a non-transitory recording medium storing a computer program for a mobile communication device, the computer program causing a processor to execute the processes of: receiving broadcast information (System Information Block) including at least one of ABS (Almost Blank Subframe) information and nonABS information; acquiring a subframe pattern used for MDT (Minimization Drive Tests) measurement from at least one of the ABS information and the nonABS information; performing, upon acquiring the subframe pattern used for the measurement, MDT measurement in accordance with the subframe pattern in a standby state; storing a result of the MDT measurement as measurement data; and transmitting the measurement data to the base station, is provided.

Advantageous Effect of Invention

According to the present invention, it is possible to provide a base station, a mobile communication device, and a communication method capable of executing MDT suitable for a heterogeneous network in which cells of different sizes coexist.

DESCRIPTION OF EMBODIMENTS

Figure 1:
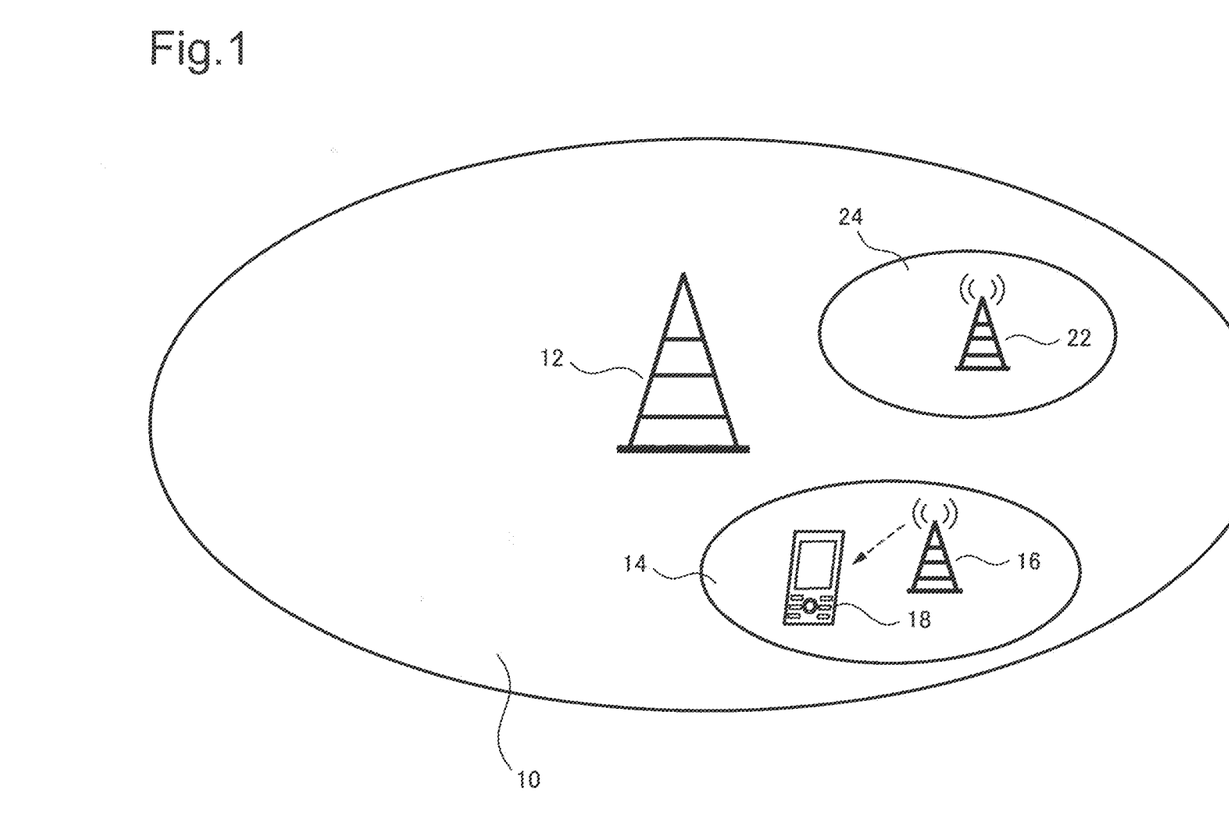
FIG. 1 is a schematic diagram illustrating a heterogeneous network system according to an exemplary embodiment of the present invention.

Referring to FIG. 1, an example of a heterogeneous network (HetNet) system (i.e., a heterogeneous network system) according to an exemplary embodiment of the present invention is illustrated. The network system illustrated in the figure includes a base station (eNB) 12 that manages a macrocell 10, and a base station (HeNB) 16 that is provided in the macrocell 10 and manages a picocell 14. In this example, a base station 22 neighboring the base station (HeNB) 16 that manages the picocell 14 is additionally provided. The base station 22 is hereinafter referred to as a neighboring base station and a cell managed by the neighboring base station 22 is hereinafter referred to as a neighboring cell 24. As illustrated in the figure, the macrocell 10, the picocell 14, and the neighboring cell 24 are formed in a manner of being at least partially superimposed on one another geographically. A mobile communication device (UE) 18 is movable between the macrocell 10, and the picocell 14 or the neighboring cell 24, while communicating with the base station (eNB) 12, and the base station (HeNB) 16 or the neighboring base station 22.

When the picocell 14 and the like are arranged in the macrocell 10 in the manner as described above, interference inevitably occurs among the base station (eNB) 12, the base station (HeNB) 16, and the neighboring base station 22. To reduce the interference among the base stations, an eICIC (enhanced Inter-Cell Interference Coordination: network coordination inter-cell interference control) technique for causing a plurality of cells to operate in a coordinated manner, is proposed.

In a network used in an eICIC environment, an aggressor cell that causes interference (the aggressor cell is hereinafter referred to as an interfering cell) (e.g., the macrocell 10) and a victim cell that suffers interference (the victim cell is hereinafter referred to as an interfered cell) (e.g., the picocell 14 and the neighboring cell 24) are present.

To avoid the inter-cell interference in the above-described network, 3GPP Release 10 introduces a subframe including no data, that is, Almost Blank Subframe (ABS). By introducing the ABS, the macrocell 10, which serves as an interfering cell that causes interference, creates a subframe (ABS) that transmits no data intentionally, and the picocell 14 and the neighboring cell 24, each of which serves as an interfered cell that suffers interference, are able to reduce interference from the macrocell 10 which serves as an interfering cell, by performing data transmission within the ABS.

In this case, in order for the mobile communication device (UE) 18 to detect a subframe including the ABS, it is necessary that the base station (eNB) 12 disposed in the macrocell 10 which serves as an interfering cell, the base station (HeNB) 16 disposed in the picocell 14 which serves as an interfered cell, and the neighboring base station 22 disposed in the neighboring cell 24 are accurately synchronized with one another. For synchronization determination, the mobile communication device (UE) 18 using the picocell 14 that is the interfered cell which serves as an serving cell, and the base station (HeNB) 16 in the picocell 14 which serves as an interfered cell exchange the measurement data.

Further, in 3GPP, along with introduction of the ABS, changes are added to Radio Link Monitoring (see TS36.133) and RSRP (Reference Signal Received Power)/RSRQ (Reference Signal Received Quality) measurement (TS36.331).

RLM refers to an operation of determining synchronization with the serving cell which the mobile communication device (UE) 18 performs when it is in an RRC (Radio Resource Control) Connected state. In the RLM, when the mobile communication device (UE) 18 connected to the picocell 14 which serves as an interfered cell uses all subframes as an RLM measurement object and uses, for synchronization determination, a measurement result of a subframe that suffers interference from the macrocell 10 which serves as an interfering cell, it detects an unnecessary synchronization loss even when communication environment in the ABS that suffers no interference is excellent. To solve the problem, the 3GPP has introduced, for the mobile communication device (UE) 18 connected to the picocell 14 which serves as an interfered cell, RLM Measurement Resource Restriction (hereinafter referred to as RLM measurement restriction), so that it can use only subframes that do not suffer interference from the macrocell 10 which serves as an interfering cell for the RLM.

Also, in the RSRP or RSRQ measurement, when the mobile communication device (UE) 18 includes a measurement result of a subframe, that suffers interference from the macrocell 10 which serves as an interfering cell, in the RSRP or RSRQ measurement object, a measured value of the RSRP or RSRQ measurement is underestimated that causes problems such as an erroneous detection of a handover, and a handover start to a false cell. To avoid such inconveniences, the 3GPP has introduced, for the mobile communication device (UE) 18 in the RRC Connected state, RRM (Radio Resource Monitoring) Measurement Resource Restriction (hereinafter referred to as RRM measurement restriction), so that it can use only subframes that suffer no interference for the RSRP/RSRQ measurement. However, the RLM measurement restriction and the RRM measurement restriction are applicable only for the mobile communication device (UE) 18 in the RRC Connected state.

In other words, it is an actual situation that the above-described measurement restrictions cannot be applied when the mobile communication device (UE) 18 is in a standby state. Accordingly, when the mobile communication device (UE) 18 measures quality of a cell in a standby state, the mobile communication device (UE) 18 uses all subframes, even subframes other than ABSs, as measurement objects even in a state that the ABS is set that results in underestimation of quality of the cell even when there is a subframe that suffers no interference.

The 3GPP has introduced Minimization of Drive Test (MDT) for measuring a cell environment (e.g., detection of out-of-range) for the mobile communication device (UE) 18 in a standby state. MDT refers to an operation in which the mobile communication device (UE) 18 in a standby state measures RSRP or RSRQ at a location where the mobile communication device (UE) 18 is present when it detects a specific time or being out-of-range. However, as described above, the RLM measurement restriction and the RRM measurement restriction may not be activated by the mobile communication device (UE) 18 in a standby state.

Accordingly, measurement data (RSRP/RSRQ) which the mobile communication device (UE) 18 acquires in the MDT has not reflected the actual state. Specifically, although the reception environment is excellent when the mobile communication device (UE) 18 uses subframes that suffer no interference, the mobile communication device (UE) 18 performs measurement using subframes including the ones that suffer interference, so that the reception state is determined to be lower than the actual reception state. Further, in the present MDT, it is impossible to acquire data indicating whether the set ABS pattern actually avoids interference.

A feature of the invention according to the present exemplary embodiment lies in accurately acquiring MDT log information under an interfering cell (Aggressor cell) in which the ABS is set, or under an interfered cell (Victim cell) in which the ABS is provided.

Specifically, a feature of the invention according to the present exemplary embodiment provides a means for acquiring correct MDT log information in consideration of the ABS even when the mobile communication device (UE) 18 is in a standby state. Further, in the actual situation, the ABS information is not taken into account in the MDT log information which the mobile communication device (UE) 18 acquires. Still further, in the actual situation, the MDT log information does not include accurate information about a measurement point.

To improve the above-described problems, a base station (eNB) 12 according to an exemplary embodiment of the present invention includes ABS/nonABS information (at least one of ABS information and nonABS information; the same applies hereinafter) in broadcast information (System Information Block). In this case, the ABS/nonABS information according to the present invention is, for example, information in which a subframe pattern used for measurement of RSRP/RSRQ (at least one of RSRP and RSRQ; the same applies hereinafter) is set in the MDT. Specifically, measSubframePatternPCell (measurement subframe pattern for Serving Cell) and measSubframePatternConfigNeigh (measurement subframe pattern for Neighbour Cell) that are defined in the 3GPP, may be used as a subframe pattern. In other words, the subframe pattern is composed of a bit string indicating each subframe used for the MDT measurement of the mobile communication device (UE) 18 (as defined by 3GPP, patterns set to the information elements (IEs) need not necessarily be ABS Patterns).

In an exemplary embodiment of the present invention, the base station (eNB) 12 reports, for example, at least one of the following four patterns as broadcast information (System Information Block).

For ABS
   measSubframePatternPCell (measurement subframe pattern for Serving Cell)
   measSubframePatternConfigNeigh (measurement subframe pattern for Neighbour Cell)

For nonABS
   measSubframePatternPCell2 (measurement subframe pattern for Serving Cell)
   measSubframePatternConfigNeigh2 (measurement subframe pattern for Neighbour Cell)

At a time of acquiring the existing broadcast information (System Information Block), the mobile communication device (UE) 18 also acquires the above-described ABS information or nonABS information.

At a time of acquiring the MDT log information, the mobile communication device (UE) 18 uses the ABS/non-ABS information (measSubframePatternPCell, measSubframePatternConfigNeigh, measSubframePatternPCell2, and measSubframePatternConfigNeigh2) acquired from the above-described broadcast information (System Information Block). In other words, the mobile communication device (UE) 18 uses only a subframe indicated by information on a measurement condition as a measurement object.

The mobile communication device (UE) 18 stores the measured information separately from the existing measurement result. Further, the mobile communication device (UE) 18 individually stores a measurement result regarding the serving cell (Serving Cell) and a measurement result regarding the neighboring cell (Neighbour Cell).

Figure 2:
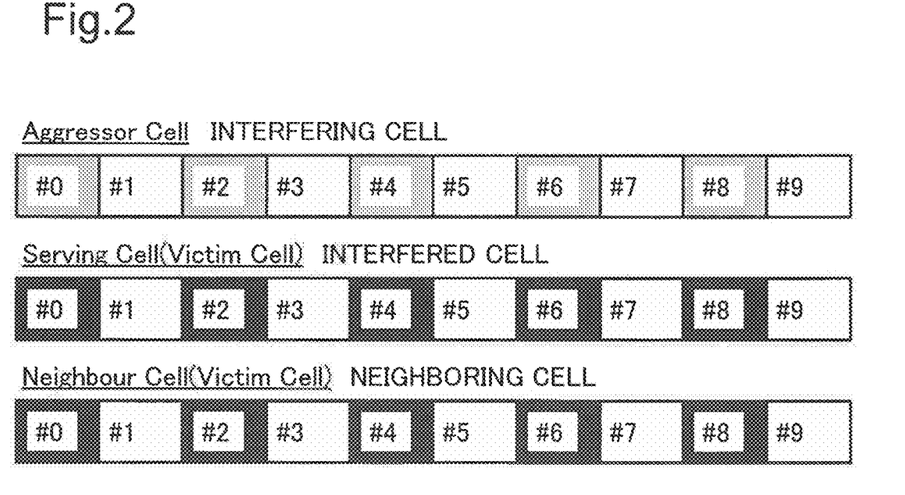
FIG. 2 is a diagram illustrating subframes used in an exemplary embodiment of the present invention.

Referring to FIG. 2, an example of a measurement pattern transmitted from the base station (eNB) 12 that manages the macrocell 10 will be described. Assume that the picocell 14 and the neighboring cell 24 neighboring the picocell 14 are present in the macrocell 10. Further, assume that the mobile communication device (UE) 18 is located in the picocell 14 and uses the picocell 14 as a serving cell. Still further, assume that the macrocell 10 is an interfering cell (Aggressor Cell), and each of the picocell 14 and the neighboring cell 24 is an interfered cell (Victim Cell) that suffers interference.

FIG. 2 illustrates downlink frames of the base station (eNB) 12 that defines the macrocell 10 which serves as an interfering cell, and each frame illustrated in the figure includes subframes (Subframes #0 to #9). The base station (eNB) 12 uses odd-numbered subframes #1, #3, #5, #7, and #9 as ABSs (Almost Blank Subframes). In other words, the base station (eNB) 12 arranges measurement pattern information in each of the ABSs #1, #3, #5, #7, and #9 that include no data. In this case, the measurement pattern information is composed of, for example, a specific bit pattern having a predetermined number of bits (e.g., 40 bits) arranged in a subframe specified by the ABS/nonABS information.

Specifically, the measurement subframe pattern information is transmitted with at least one of the following settings included in Type 1 of System Information Block.

Bit 1 is set in odd-numbered subframes of measSubframePatternPCell (i.e., bits constituting the measurement subframe pattern are set in the subframes #1, #3, #5, #7, #9, and the like of the serving cell (Serving Cell))

Bit 1 is set in odd-numbered subframes of measSubframePatternConfigNeigh (i.e., bits constituting the measurement subframe pattern are set in the subframes #1, #3, #5, #7, #9, and the like of the neighboring cell (Neighbour Cell))

Bit 1 is set in even-numbered subframes of measSubframePatternPCell2 (i.e., bits constituting the measurement subframe pattern are set in the subframes #0, #2, #4, #6, #8, and the like of Serving Cell)

Bit 1 is set in even-numbered subframes of measSubframePatternConfigNeigh2 (bits constituting the measurement subframe pattern are set in the subframes #0, #2, #4, #6, #8, and the like of Neighbour Cell)

On the other hand, upon receiving the measurement subframe pattern indicating odd-numbered subframes (Subframes #1, #3, #5, #7, and #9) that do not suffer from interference from measSubframePatternPCell and measSubframePatternConfigNeigh, the mobile communication device (UE) 18 located in the picocell 14 performs measurement of RSRP/RSRQ in the odd-numbered subframes. In this manner, the RSRP/RSRQ is measured only in the subframes that suffer no interference. Further, the mobile communication device (UE) 18 located in the picocell 14 can measure each of the RSRP and RSRQ only in the subframes that suffer interference from measSubframePatternPCell2 and measSubframePatternConfigNeigh2. In addition, the mobile communication device (UE) 18 may measure the RSRP/RSRQ by using the above-described two methods in combination.

Different patterns can be set respectively as the above-described four measurement subframe patterns used in this exemplary embodiment. In other words, the ABS pattern set in the serving cell (Serving Cell) may be different from the ABS pattern set in the neighboring cell (Neighbour Cell).

At a time of reporting the MDT log information to the base station (eNB) 12, the mobile communication device (UE) 18 reports the measurement data which it had stored as described above (it does not include non-measurement data in the report). The mobile communication device (UE) 18 can also include the ABS/nonABS information (measSubframePatternPCell, measSubframePatternConfigNeigh, measSubframePatternPCell2, and measSubframePatternConfigNeigh2) in the MDT log information.

Figure 3:
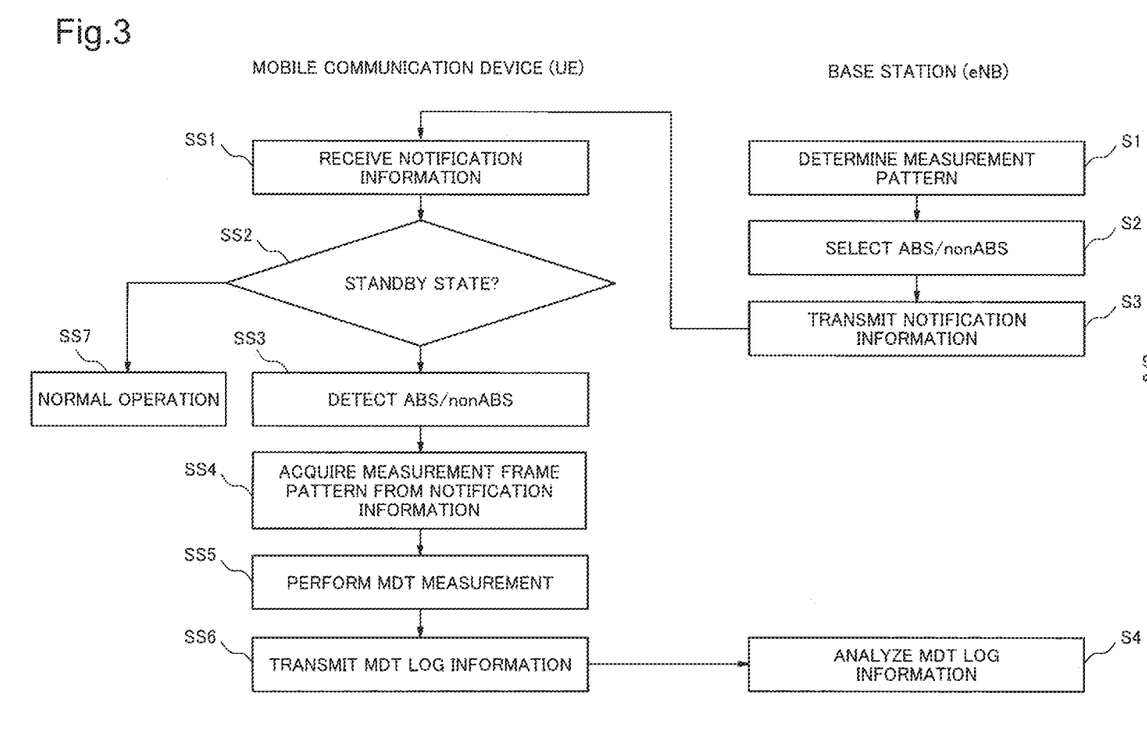
FIG. 3 is a flowchart illustrating an operation of the heterogeneous network system according to an exemplary embodiment of the present invention.

Referring to FIG. 3, an operation of the base station (eNB) 12 and the mobile communication device (UE) 18 according to the above-described exemplary embodiment will be described.

First, the base station (eNB) 12 determines a measurement subframe pattern (step S1), and then selects ABS and/or nonABS information to be included in broadcast information (System Information Block) (step S2). The base station (eNB) 12 locates the ABS/nonABS information in each subframe depending on the selected ABS/nonABS information and the determined measurement subframe pattern, and transmits the ABS/nonABS information to the mobile communication device (UE) 18 as the broadcast information (System Information Block) (step S3).

Upon receiving the broadcast information (System Information Block) from the base station (eNB) 12 (step SS1), the mobile communication device (UE) 18 determines whether the mobile communication device (UE) 18 is in a standby state in step SS2. When the mobile communication device (UE) 18 is not in a standby state (SS2: No), the mobile communication device (UE) 18 performs normal processing (step SS7). When the mobile communication device (UE) 18 is in a standby state (SS2: Yes), the mobile communication device (UE) 18 detects the ABS/nonABS information (step SS3). Upon acquiring the measurement subframe pattern indicating the ABS/nonABS information of a plurality of subframes (step SS4), the mobile communication device (UE) 18 performs MDT measurement in the subframe specified by the ABS/nonABS information (step SS5).

Subsequently, the mobile communication device (UE) 18 transmits the MDT log information representing a measurement result to the base station (eNB) 12 (step SS6).

Upon receiving the MDT log information from the mobile communication device (UE) 18, the base station (eNB) 12 performs automatic optimization processing by analyzing the MDT log information and understanding an operation state of the network (step S4).

Figure 4:
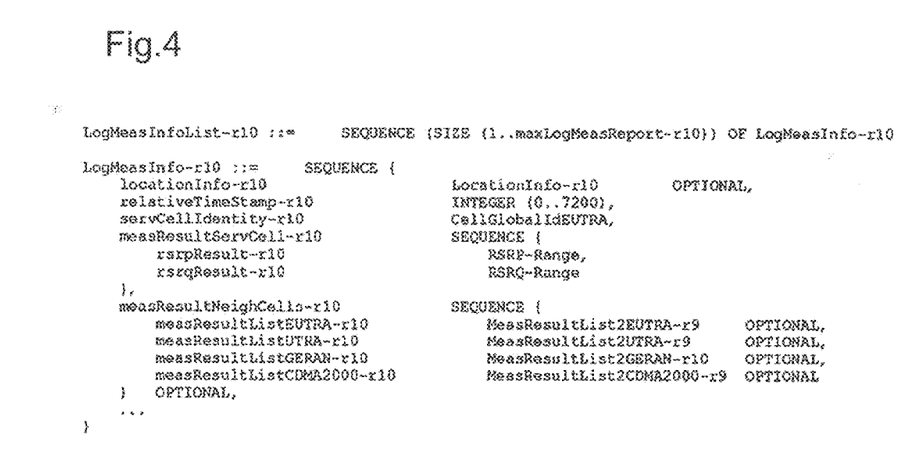
FIG. 4 is a diagram illustrating an example of MDT log information.

Referring to FIG. 4, MDT log information defined in 3GPP TS36.331 is illustrated.

For example, when the RSRP obtained by the measurement using only the ABS is excellent and the obtained RSRQ is low, the base station (eNB) 12, which received the above-described information, judges that the ABS pattern is suffering interference from another cell. As a result, the base station (eNB) 12 can perform optimization of the ABS pattern by changing the setting of the ABS. Further, when both the RSRP and the RSRQ obtained by the measurement using only the nonABS are excellent and both the RSRP and the RSRQ obtained by the measurement using only the ABS pattern are also excellent, the base station (eNB) 12 can stop the ABS.

Figure 5:
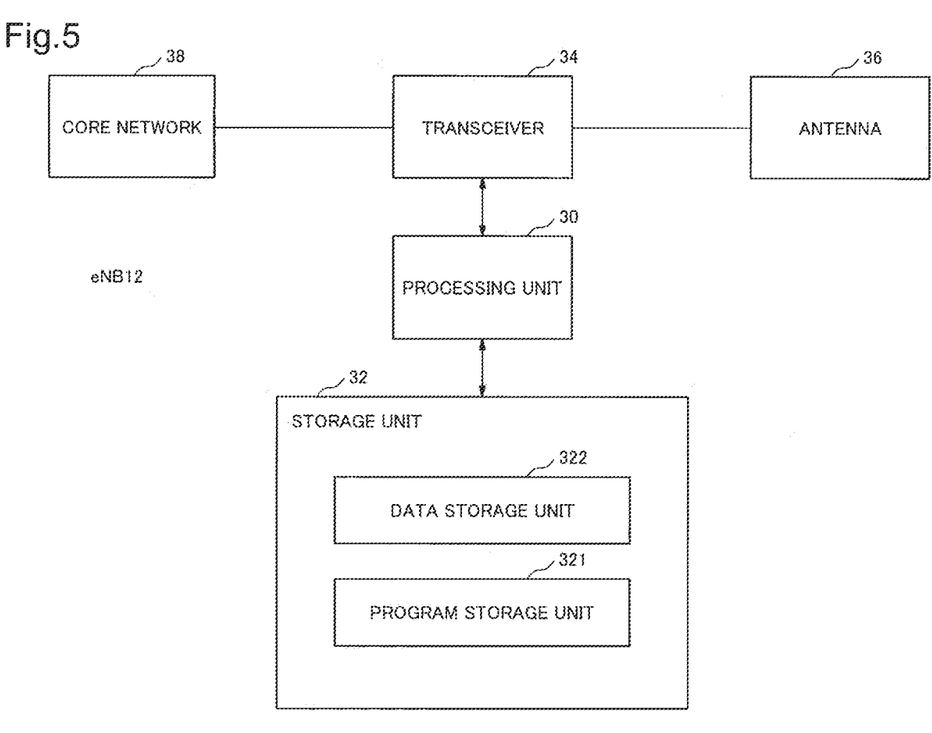
FIG. 5 is a block diagram illustrating a base station (eNB) according to an exemplary embodiment of the present invention.

Referring to FIG. 5, a configuration of a base station (eNB) 12 according to an exemplary embodiment that performs operation illustrated in FIG. 3 will be described.

The base station (eNB) 12 illustrated in the figure includes a processing unit 30, a storage unit 32, and a transceiver 34. The transceiver 34 is connected to an antenna 36 and is also connected to a core network 38.

The memory unit 32 includes a program storage unit 321 that stores an OS and a base station program for MDT according to the present invention, and a data storage unit 322. The base station program for MDT may be stored in a semiconductor storage apparatus, such as a ROM (Read Only Memory), a RAM (Random Access Memory), and a flash memory, or a non-transitory recording medium, such as an optical disk, a magnetic disk, and a magneto-optical disk. The data storage unit 322 includes a measurement pattern storage unit that stores a measurement pattern, a storage unit that stores broadcast information (System Information Block) and ABS/nonABS information, and a storage unit that stores MDT log information received from the mobile communication device (UE) 18.

The processing unit 30 that performs processing in accordance with the OS and the base station program for MDT stored in the program storage unit 321 is composed of, for example, a processor. The base station program for MDT causes the processor to execute the processing illustrated in FIG. 3. Specifically, the processing unit 30 includes the ABS/nonABS information in the broadcast information (System Information Block) for transmission. In the case of transmitting each piece of ABS/nonABS information, the processing unit 30 selects the ABS/nonABS information and allocates bits depending on the measurement subframe pattern to the selected ABS/nonABS information for transmission.

Specifically, in the case of selecting the ABS/nonABS information, the processing unit 30 performs processing of selecting at least one of the four patterns including measSubframePatternPCell and measSubframePatternConfigNeigh for the ABS and measSubframePatternPCell2 and measSubframePatternConfigNeigh2 for the nonABS. After the ABS/nonABS information is selected, the processing unit 30 allocates bits depending on the measurement subframe pattern to each subframe.

The ABS/nonABS information including the allocated measurement subframe pattern is transmitted as a part of the broadcast information (System Information Block) via the transceiver 34 and the antenna 36 under control of the processing unit 30.

Upon receiving the MDT log information from the mobile communication device (UE) 18, the base station (eNB) 12 stores the MDT log information in the data storage unit 322, and performs processing necessary for the MDT to transmit the processing result to the core network 38 and the like.

Figure 6:
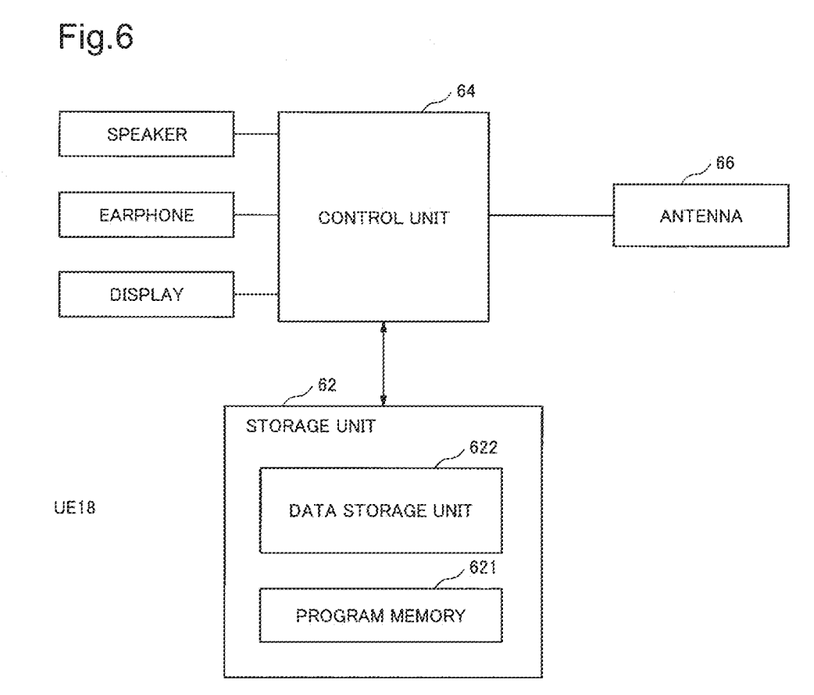
FIG. 6 is a block diagram illustrating an example of a mobile communication device according to an exemplary embodiment of the present invention.

Referring to FIG. 6, an example of a mobile communication device (UE) 18 according to an exemplary embodiment of the present invention is illustrated. The mobile communication device (UE) 18 illustrated in the figure includes a storage unit 62, a control unit 64, and an antenna 66. The control unit 64 illustrated in the figure is connected to a speaker, an earphone, a display, and the like. On the other hand, the storage unit 62 includes a program memory 621 that stores an OS and a program for a mobile device, and a data storage unit 622 that stores measurement results of the MDT log information and the like. The program for a mobile device may be stored in a semiconductor storage apparatus, such as a ROM (Read Only Memory), a RAM (Random Access Memory), and a flash memory, or a non-transitory recording medium, such as an optical disk, a magnetic disk, and a magneto-optical disk.

The control unit 64 is composed of, for example, a processor. The control unit 64 executes the following processing as illustrated in FIG. 3 in accordance with the program for a mobile device that is stored in the program memory 621, from the broadcast information (System Information Block) received through the antenna 66. The control unit 64 detects the ABS/nonABS information. Upon acquiring the measurement subframe pattern from the ABS/nonABS information, the control unit 64 performs the MDT measurement on the selected ABS/nonABS information. A result of the MDT measurement is stored in the data storage unit 622. In this case, a result of the MDT measurement in the serving cell and a result of the MDT measurement in the neighboring cell are stored in individual areas of the data storage unit 622.

Further, the MDT log information that is a result of the MDT measurement is reported to the base station (eNB) 12 via the antenna 66.

The base station (eNB) 12 that received the MDT log information analyzes the MDT log information, and determines whether the network configuration is optimum. When the network configuration is not optimum, the base station (eNB) 12 performs change on the ABS/nonABS information or the like.

The ABS/nonABS information transmitted from the base station (eNB) 12 includes information about an interfered cell and a neighboring cell, and includes the measurement pattern that covers a plurality of pieces of ABS/nonABS information.

Accordingly, even when the mobile communication device (UE) 18 is in a standby state, the mobile communication device (UE) 18 can perform measurement by using only the selected subframe. Therefore, the mobile communication device (UE) 18 can receive the MDT information accurately. Further, since the measurement subframe pattern covers a plurality of subframes, the base station (eNB) 12 can accurately understand whether the ABS pattern is being able to avoid the interference. Therefore, it is possible to provide a base station, a mobile communication device, and a communication method that are capable of executing the MDT suitable for a heterogeneous network in which cells in different sizes coexist.

While the present invention has been described above referring to exemplary embodiments, the present invention is not limited to the above-described exemplary embodiments. The configuration and details of the present invention can be modified in various ways that can be understood by those skilled in the art within the scope of the present invention.

The whole or a part of the above-described exemplary embodiments can be described as, but not limited to, the following supplementary notes.

(Supplementary Note 1)

A heterogeneous-network-use base station comprising:

a means for including ABS (Almost Blank Subframe)/nonABS information in broadcast information (System Information Block) and setting a subframe pattern used for measurement in the ABS/nonABS information; and a means for transmitting the subframe pattern used for the measurement as the broadcast information.

(Supplementary Note 2)

The heterogeneous-network-use base station wherein the measurement pattern is at least one of a measurement subframe pattern for a serving cell and a measurement subframe pattern for a neighboring cell.

(Supplementary Note 3)

The heterogeneous-network-use base station wherein the measurement pattern is included in the ABS information.

(Supplementary Note 4)

The heterogeneous-network-use base station wherein the measurement pattern is included in the nonABS information.

(Supplementary Note 5)

The heterogeneous-network-use base station wherein the ABS information is at least one of measSubframePattern-PCell and measSubframePatternConfigNeigh.

(Supplementary Note 6)

The heterogeneous-network-use base station wherein the nonABS information is at least one of measSubframePatternPCell2 and measSubframePatternCongfigNeigh2.

(Supplementary Note 7)

The heterogeneous-network-use base station further comprising a means for receiving MDT (Minimization Drive Tests) information as a response to the measurement pattern.

(Supplementary Note 8)

The heterogeneous-network-use base station wherein the MDT information is MDT log information.

(Supplementary Note 9)

A mobile communication device comprising: a means for receiving broadcast information including ABS (Almost Blank Subframe) information;

a means for detecting, in a standby state, a subframe pattern used for measurement from the broadcast information;

a means for detecting the subframe pattern used for the measurement and measuring the broadcast information;

a storage means for storing a result of the measurement as measurement data; and a means for transmitting the measurement data.

(Supplementary Note 10)

The mobile communication device characterized in that the measurement data are transmitted as MDT log information.

(Supplementary Note 11)

The mobile communication device wherein the measurement data includes at least one of ABS measurement data and nonABS measurement data.

(Supplementary Note 12)

The mobile communication device wherein the MDT log information includes ABS/nonABS information.

(Supplementary Note 13)

The mobile communication device wherein the storage means stores the measurement data and the ABS/nonABS information as a log list.

(Supplementary Note 14)

A communication method between a base station and a mobile communication device used in a heterogeneous network, the communication method comprising:

including, by the base station, ABS/nonABS information in broadcast information (System Information Block) and transmitting the ABS/nonABS information as a subframe pattern used for measurement; and receiving, by the mobile communication device in a standby state, the broadcast information including the ABS/nonABS information, detecting the subframe pattern used for the measurement, starting measurement, storing a result of the measurement as measurement data, and transmitting the measurement data to the base station.

(Supplementary Note 15)

A computer program for a base station, the computer program causing a processor to execute the processes of:

including ABS/nonABS information in broadcast information (System Information Block) and generating the ABS/nonABS information as a subframe pattern used for measurement; and transmitting the measurement pattern.

(Supplementary Note 16)

A computer program for a mobile communication device, the computer program causing a processor to execute the processes of:

receiving broadcast information including ABS/nonABS information;

acquiring a subframe pattern used for measurement from the ABS/nonABS information;

performing, upon acquiring the subframe pattern used for the measurement, MDT measurement of the broadcast information in a standby state;

storing a result of the MDT measurement as measurement data; and transmitting the measurement data to the base station.

This application is based upon and claims the benefit of priority from Japanese patent application No. 2014-102137, filed on May 16, 2014, the disclosure of which is incorporated herein in its entirety by reference.

REFERENCE SIGNS LIST

10 Macrocell
12 Base station (eNB)
14 Picocell
16 Base station (HeNB)
18 Mobile communication device (UE)
22 Neighboring base station
24 Neighboring cell
30 Processing unit
32 Storage unit
321 Program storage unit
322 Data storage unit
34 Transceiver
36 Antenna
38 Core network 62 Storage unit
621 Program memory
622 Data storage unit
64 Control unit
66 Antenna

What is claimed is:

1. A heterogeneous-network-use base station comprising:
a controller configured to include at least one of ABS (Almost Blank Subframe) information and nonABS information in broadcast information (System Information Block) and to set a subframe pattern used for MDT (Minimization Drive Tests) measurement in at least one of the ABS information and the nonABS information, the MDT measurement including RSRP (Reference Signal Received Power) and RSRQ (Reference Signal Received Quality);
a transmitter configured to include the subframe pattern used for the measurement in the broadcast information and to transmit the broadcast information; and
a receiver configured to receive MDT measurement data as a response to transmission of the subframe pattern,
wherein the controller is configured to stop setting of the ABS based on the MDT measurement data when the RSRP and the RSRQ are each greater than a corresponding threshold.

2. The heterogeneous-network-use base station according to claim 1, wherein the controller is configured to set at least one of a subframe pattern for a serving cell and a subframe pattern for a neighboring cell in at least one of the ABS information and the nonABS information.

3. The heterogeneous-network-use base station according to claim 2, wherein the controller is configured to set at least one of measSubframePatternPCell, measSubframePattern-ConfigNeigh, measSubframePatternPCell2, and measSubframePatternCongfigNeigh2 in at least one of the ABS information and the nonABS information.

4. A mobile communication device comprising:
a receiver configured to receive broadcast information (System Information Block) including at least one of ABS (Almost Blank Subframe) information and non-ABS information, the MDT measurement including RSRP (Reference Signal Received Power) and RSRQ (Reference Signal Received Quality);
a controller configured to detect, in a standby state, a subframe pattern used for MDT (Minimization Drive Tests) measurement from the broadcast information, to detect the subframe pattern used for the measurement, to perform measurement in accordance with the subframe pattern, and to transmit the measurement data; and
a storage configured to store a result of the measurement as measurement data,
wherein the receiver is further configured to receive MDT measurement data as a response to transmission of the subframe pattern, and wherein the controller is further configured to stop setting of the ABS based on the MDT measurement data when the RSRP and the RSRQ are each greater than a corresponding threshold.

5. The mobile communication device according to claim 4, wherein the controller is configured to transmit MDT log information as the measurement data.

6. A communication method for a heterogeneous-network-use base station, comprising:
including at least one of ABS (Almost Blank Subframe) information and nonABS information in broadcast information (System Information Block) and setting a subframe pattern used for MDT (Minimization Drive Tests) measurement in at least one of the ABS information and the nonABS information, the MDT measurement including RSRP (Reference Signal Received Power) and RSRQ (Reference Signal Received Quality);
including the subframe pattern used for the measurement in the broadcast information and transmitting the broadcast information;
receiving MDT measurement data as a response to transmission of the subframe pattern;
setting of the ABS based on the MDT measurement data;
stop setting of the ABS based on the MDT measurement data when the RSRP and the RSRQ are each greater than a corresponding threshold.

7. The heterogeneous-network-use base station according to of claim 1, wherein
the controller is configured to set a subframe pattern for a serving cell and a subframe pattern for a neighboring cell in at least one of the ABS information and the nonABS information, and to set different subframe patterns as the subframe pattern for the serving cell and the subframe pattern for the neighboring cell, respectively.

8. The heterogeneous-network-use base station according to claim 1, further comprising a receiver configured to receive MDT measurement data as a response to transmission of the subframe pattern,
wherein the controller is configured to change the subframe patterns set in at least one of the ABS information and the nonABS information based on the MDT measurement data.

* * * * *